United States Patent
Wakatani

[11] Patent Number: 5,887,188
[45] Date of Patent: Mar. 23, 1999

[54] MULTIPROCESSOR SYSTEM PROVIDING ENHANCED EFFICIENCY OF ACCESSING PAGE MODE MEMORY BY MASTER PROCESSOR

[75] Inventor: Akiyoshi Wakatani, Osaka, Japan

[73] Assignee: Matsushita Electric Industrial Co., Ltd., Osaka, Japan

[21] Appl. No.: 566,722

[22] Filed: Aug. 13, 1990

[30] Foreign Application Priority Data

Aug. 14, 1989 [JP] Japan ................................. 1-207835

[51] Int. Cl.$^6$ ................................................. G06F 15/167
[52] U.S. Cl. ........................................ 395/800.31; 711/147
[58] Field of Search .................................. 395/800, 425, 395/200, 800.31, 200.38, 200.39, 200.4, 200.41; 711/147, 146

[56] References Cited

U.S. PATENT DOCUMENTS

| 4,814,970 | 3/1989 | Barbagelata et al. | 395/800.28 |
| 4,912,630 | 3/1990 | Cochcroft, Jr. | 405/217 |
| 4,959,777 | 9/1990 | Holman, Jr. | 711/141 |
| 4,984,209 | 1/1991 | Rajaram et al. | 365/222 |
| 5,155,809 | 10/1992 | Baker et al. | 395/200.57 |
| 5,159,676 | 10/1992 | Wicklund et al. | 711/107 |

*Primary Examiner*—William M. Treat
*Attorney, Agent, or Firm*—Lowe Hauptman Gopstein & Berner

[57] ABSTRACT

In a multiprocessor system in which a master processor and a plurality of slave processors access in common a page mode memory, each slave processor functions such that upon completion of a memory access by the slave processor, the page address which was being accessed prior to that access by the slave processor is reloaded into the page buffer of the memory. Since in general each access by a slave processor is preceded by and followed by an access by the master processor, generally to the same page of the memory, this reduces the number of long accesses that must be executed by the master processor as a result of intervening accesses by slave processors.

4 Claims, 8 Drawing Sheets

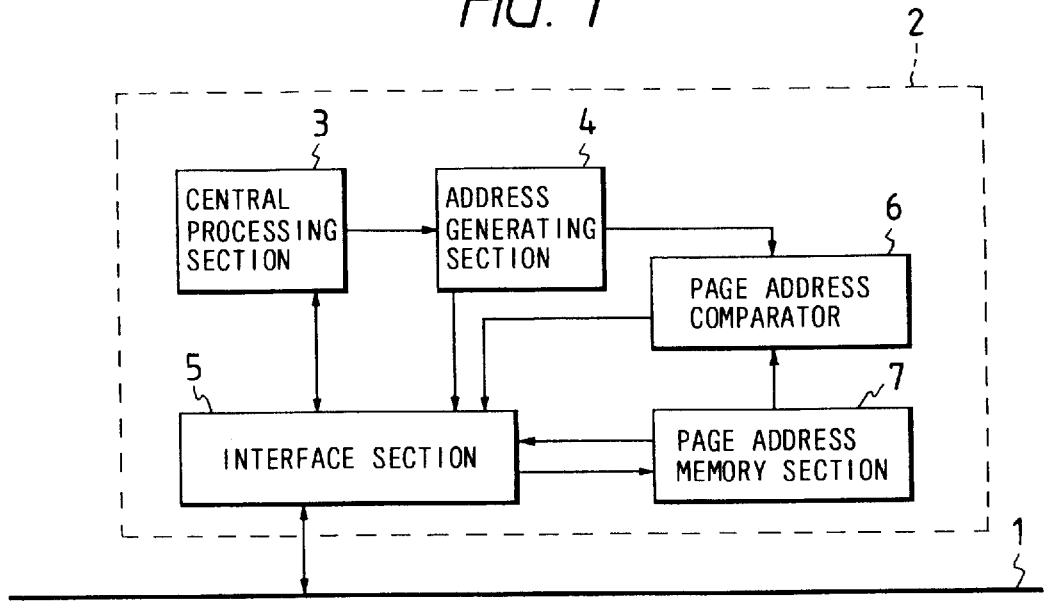
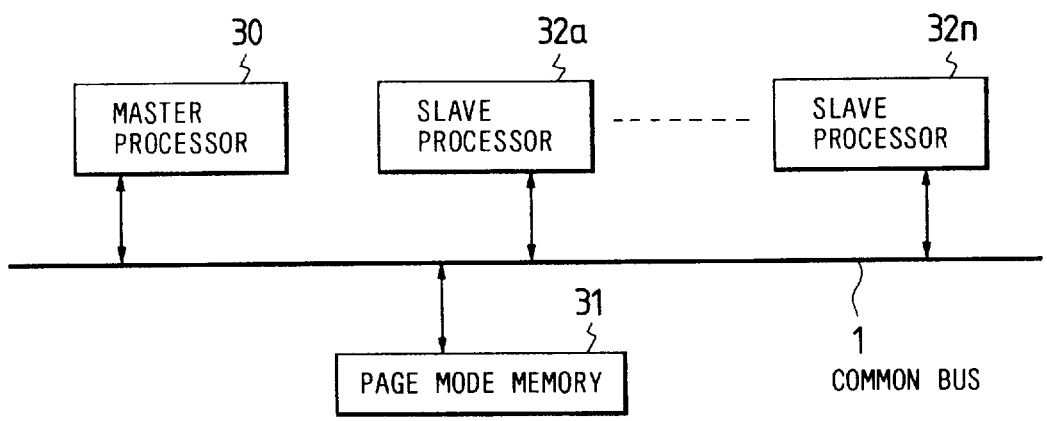

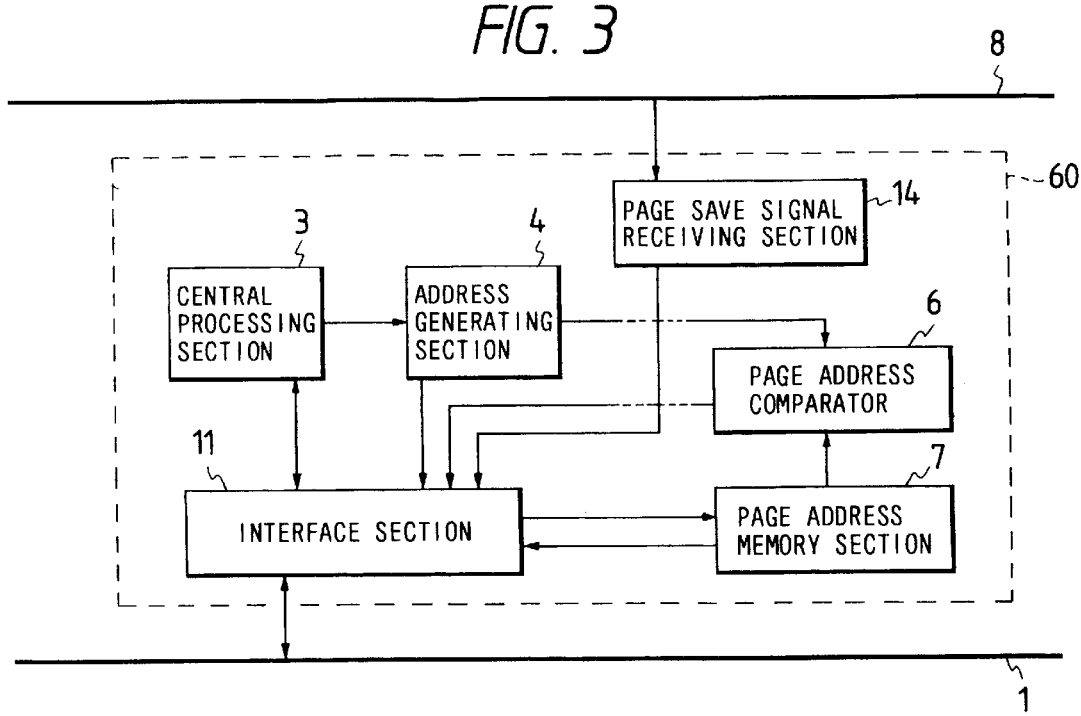
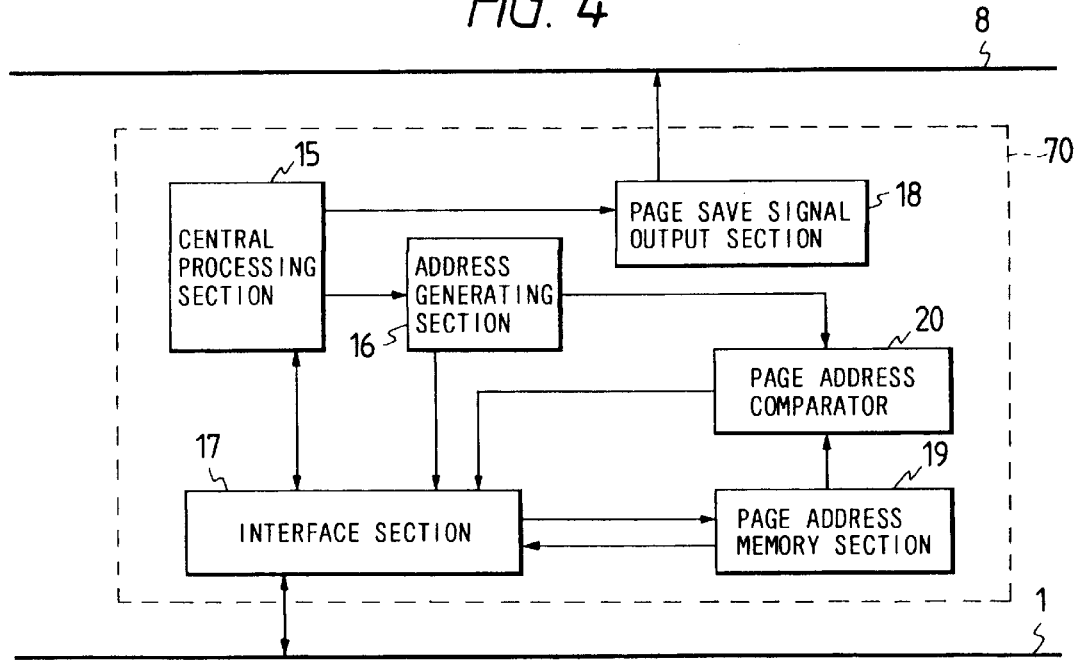

FIG. 10
PRIOR ART

| | MASTER PROCESSOR PROGRAM SEQUENCE |
|---|---|
| 1 | OTHERS |
| 2 | ACCESS p/a |
| 3 | OTHERS |
| 4 | OTHERS |
| 5 | OTHERS |
| 6 | ACCESS p/b |
| 7 | OTHERS |

| | SLAVE PROCESSOR PROGRAM SEQUENCE |
|---|---|
| 1 | OTHERS |
| 2 | OTHERS |
| 3 | ACCESS q/e |
| 4 | OTHERS |
| 5 | OTHERS |
| 6 | OTHERS |
| 7 | OTHERS |

"ACCESS": MEMORY ACCESS INSTRUCTION (PAGE ADDRESS/INTRA-PAGE ADDRESS).
"OTHERS": ANY INSTRUCTION OTHER THAN ABOVE.

| MASTER PROCESSOR EXECUTION STEPS | OTHER 1 | ACCESS p | OTHER 2 | ACCESS a | OTHER 3 | OTHER 4 | OTHER 5 | ACCESS p | ACCESS b |
|---|---|---|---|---|---|---|---|---|---|
| SLAVE PROCESSOR EXECUTION STEPS | OTHER 1 | OTHER 2 | NOP | ACCESS q | ACCESS e | OTHER 4 | OTHER 5 | OTHER 6 | |

MULTIPROCESSOR SYSTEM PROVIDING ENHANCED EFFICIENCY OF ACCESSING PAGE MODE MEMORY BY MASTER PROCESSOR

BACKGROUND OF THE INVENTION

1. Field of the Invention

The present invention relates to an improvement of a multiprocessor system which utilizes a page mode memory as a common memory for a master processor and a plurality of slave processors. More particularly, the invention relates to an improvement of such a multiprocessor system for reducing the adverse effects upon the performance of the master processor of memory accesses which are executed by the slave proccessors

2. Prior Art Technology

In recent years, a type of memory known as a page mode memory has come into widespread application as a common memory of a multiprocessor system, i.e. which is accessed in common by the master processor and the slave processors of that system, which are linked via a common address bus and a common data bus (or a single bus which provides both address and data transfer functions by multiplexed operation) to the page mode memory. A page mode memory is generally of DRAM (dynamic random access memory) type. Each memory address consists of a portion referred to in the following as a page address (where a page consists of a fixed number of successively adjacent addresses within a specific region of the memory), and a portion which represents the position of the address within that page (the latter portion being referred to in the following as an intra-page address). Accessing of an address of the page mode memory by a processor may be executed in two consecutive periods (such an access being referred to in the following as a long access), with the processor (master processor or slave processor) first outputting to the page mode memory the required page address and a page load command. When these are received by the page mode memory, the data of that page are loaded into a page buffer, which is an integral part of the page mode memory and from which respective addresses within the page can be rapidly accessed using the intra-page addresses. However the configuration of a page mode memory to which the present invention is applicable is not limited to such an arrangement. Next, the processor outputs to the page mode memory the intra-page address and accesses that address, e.g. by writing or reading data to or from the address.

Once such a long access has been executed, then thereafter, so long as the processor continues to access only addresses which lie within the page that has been loaded into the page buffer of the page mode memory, it is only necessary for the processor to output to the page mode memory the intra-page address of a desired address in order to access that address. Such a type of access will be referred to in the following as a short access.

The above is illustrated in the example of FIG. 10. The upper part of FIG. 10 shows two program sequences which are to be respectively executed in parallel by the master processor and one of the slave processors of a prior art multiprocessor system which utilizes a page mode memory. In each program, "access" denotes a page mode memory access instruction, and for example "access p/a" signifies "access the (intra-page) address a within the page p (more specifically, the page having the page address p)". In each program "others" signifies any instruction other than a memory access instruction. The lower part of FIG. 10 shows the respective sequences of operations that are actually executed in parallel by the master processor and slave processor, to execute the respective program instruction sequences. In the step "access p", the master processor outputs to the page mode memory the page address p and a command for loading that page into the page buffer of the memory. Next, in the second operating step of the long access, the master processor outputs to the memory the intra-page address a, and that address is then accessed by the master processor. While the master processor is doing this, the slave processor must wait for one operating period (as indicated by "nop"), then the slave processor begins a long access in which the page g is first loaded into the page buffer, then the intra-page address e within that page is accessed by the slave processor.

However, since the page mode memory is being used in common by the master processor and slave processor, when the master processor subsequently has to again access an address within the page p, i.e. after executing the instruction "other 5", it is necessary for the master processor to again execute a long access, i.e. to again send the page address p to the memory to load that page into the page buffer, then to access the required address b within that page. It can be understood that if there had been no memory access by a slave processor to a page which is different from page p during the interval between the accessing of address a and address b by the master processor, it would not have been necessary to re-load the page p into the page buffer of the memory, i.e. it would only have been necessary to execute a short access. Thus, in a prior art multiprocessor system which utilizes a page mode memory as a common memory of the system, each time that the master processor of the system is executing successive accesses to addresses within a single page, and a slave processor executes a memory access (intervening between these successive accesses by the master processor) to a page which is different from that being accessed by the master processor, the speed of program execution by the master processor is correspondingly slowed. Since the performance of the system is essentially determined by that of the the master processor, the system performance is lowered as a result.

This is a significant problem since, in practice, it is necessary for the slave processors to access addresses within a different region or regions of the memory from the memory region or regions accessed by the master processor. Thus, it is almost certain that when a slave processor accesses the memory, it will access a different page from the last page that was accessed by the master processor.

As a result, such a prior art type of multiprocessor system utilizing a common page mode memory cannot benefit fully from the basic advantage of using a page mode memory, i.e. a reduction of the average memory access time.

SUMMARY OF THE INVENTION

It is an objective of the present invention to overcome the disadvantages of the prior art as set out above, by providing a multiprocessor system utilizing a page mode memory as a common memory of the master processor and slave processors of the system, whereby the program execution speed of the master processor of the system will not be reduced as a result of memory accesses that are executed by the slave processors.

To achieve that objective, a processor used as a slave processor in a multiprocessor system according to the present invention functions such that, when the slave processor accesses the page mode memory, if the page that is accessed is different from the last page that was accessed by any other processor (which in practice usually signifies the last page to have been accessed by the master processor), then the slave processor executes reloading of that page into the page buffer of the memory when it has completed its memory access. As a result, the next memory access by the master processor will be a short access, so that the problem described above is eliminated.

More specifically, with the present invention, a processor for use as a slave processor in a multiprocessor system having a page mode memory connected by bus means to all processors of said system comprises:

processing means;

address generating means responsive to commands from said processing means for generating addresses each consisting of a successively generated page address and intra-page address;

page address memory means for holding a page address of a page that has been most recently accessed by any processor of said system;

page address comparator means for comparing the page address held in said page address memory means with a newly generated page address from said address generating means; and interface means for monitoring address transfers occurring on said bus means, for setting said most recent page address into said page address memory means and for transferring data, command signals and addresses between said processor and said bus means;

in which when a memory access is executed by said processor, said interface means is responsive to an output signal produced from said comparator means such that, if the page address that is held in said page address memory means during said access is different from a page address that is outputted from said address generating means at the start of said access, said interface means executes loading of the page address held in said page address memory means into a page buffer of said page mode memory at the time of completion of said memory access by said processor.

BRIEF DESCRIPTION OF THE DRAWINGS

FIG. 1 is a block diagram of a first embodiment of a processor for use as a slave processor in a multiprocessor system according to the present invention;

FIG. 2 is a block diagram of a first embodiment of a multiprocessor system according to the present invention;

FIG. 3 is a block diagram of a second embodiment of a processor for use as a slave processor;

FIG. 4 is a block diagram of a processor for use as a master processor in a multiprocessor system according to the present invention, in conjunction with the slave processor of FIG. 3;

FIGS. 7 to 10 are program execution examples for illustrating the operation of respective embodiments of the invention and of the prior art.

DESCRIPTION OF PREFERRED EMBODIMENTS

Figure 5:
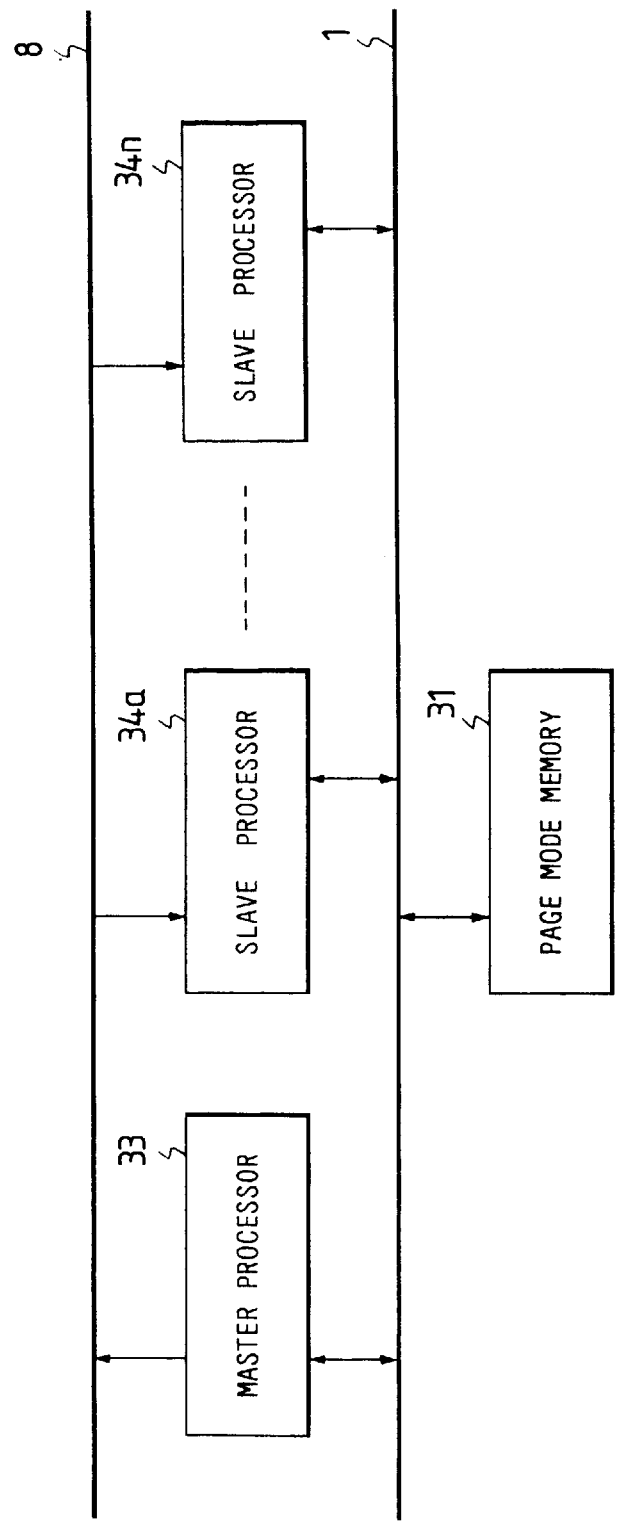
FIG. 5 is a block diagram of a multiprocessor system for using the slave processor of FIG. 3 and master processor of FIG. 4.

FIG. 1 is a block diagram of a first embodiment of a slave processor for use in a multiprocessor system according to the present invention, and FIG. 2 is a simple block diagram of a multiprocessor system utilizing such a slave processor. In FIG. 2, 30 denotes a master processor, 32a to 32n denote a set of slave processors, and 31 denotes a page mode memory, with all of these being interconnected by a common bus 1. The common bus 1 represents all of the buses which are common to the processors and memory of the system, e.g an address bus and data bus each of which is connected in common to the master processor 30, slave processors 32a to 32n and page mode memory 31, or a single bus which is used for both data and address transfer, by multiplex operation, and a control signal bus for sending commands to the page mode memory, e.g. commands (issued by the master processor or slave processor which currently has the right of memory access) signifying for example "load the page p into the page buffer", or "write the data currently appearing on the data bus into address s within the page that is in the page buffer".

In FIG. 1, numeral 2 denotes one of the slave processors 32a to 32n, which is formed of a central processing section 3, an address generating section 4, an interface section 5, a page address comparator 6 and a page address memory section 7. The interface section 5 controls the transfer of data and addresses between the common bus 1 and the slave processor 2. The page address memory section 7 serves to hold (i.e. while a memory access is being executed by the slave processor 2) the address of the last page to have been accessed by any of the processors in the multiprocessor system, including the slave processor 2. More specifically, the interface section 5 continuously monitors processing operations by the processing section 3 and address transfers which take place on the common bus 1, to detect successive memory accesses by the various processors of the system. Each time that a new page is accessed by any processor, the interface section 5 transfers that page address to the page address memory section 7 to be held therein. The page address comparator 6 serves to compare that page address held in the page address memory section 7 with that of a page which is to be newly accessed by the slave processor 2.

The operation of this embodiment is as follows. During execution of successive instructions of a program by the processing section 3, when a memory access is reached, the processing section 3 sends corresponding signals to the address generating section 4, which thereby generates the address of the page that is to be accessed. The page address comparator 6 compares the page address held in the page address memory section 7 with this newly generated page address, and if that new page is different from the page whose address is held in the page address memory section 7, then the page address comparator 6 sends a signal to the interface section 5 whereby the new page address is transferred from the interface section 5 via the common bus 1 to the page mode memory 31, so that the new page is loaded into the page buffer of the page mode memory. That is to say, a long access is initiated, in this case. The address generating section 4 then generates the intra-page address that is specified by the instruction that is being processed by the processing section 3, and this is sent via the interface section 5 and the common bus 1 to the page mode memory 31, so that the desired address can now be accessed.

If on the other hand the page address comparator 6 finds that the page address held in the page address memory section 7 is identical to the newly generated page address from the address generating section 4, then an output signal from the page address comparator 6 is sent via the interface section 5 to the processing section 3, whereby the address generating section 4 is caused to immediately output to the interface section 5 the intra-page address. That is to say, a short access is executed in this case.

The interface section 5 of the slave processor of this embodiment is configured to respond to the output signals produced from the page address comparator 6 such that, if the newly generated address from the address generating section 4 is found to be different from the page address that is held in the page address memory section 7, then when the slave processor 2 has completed its memory access, the interface section 5 sends the page address held in the page address memory section 7 via the common bus 1 to the page mode memory, to cause that page to be reloaded into the page buffer. In that way, since in general each memory access by a slave processor will be a single access which occurs at an intermediate point between successive memory accesses by the master processor, and since in many cases the master processor will be sequentially processing addresses that are closely adjacent to one another within a small region of the memory and hence will usually be located in the same page, the page which the master processor causes to be reloaded into the page buffer upon completion of a slave processor memory access will generally be the page which the master processor has to access next. In this way it is ensured that each memory access by the master processor that occurs following a memory access by any of the slave processors will be a short access. Thus, since the frequency of memory accessing by the master processor is in general much higher than that of the slave processors, the overall performance of the multiprocessor system can be substantially improved, by reducing the number of long accesses that must be executed by the master processor.

It can thus be understood that this embodiment of processor for use as a slave processor of a multiprocessor system according to the present invention basically differs from a slave processor of the prior art in that, if the address of the last page to be accessed prior to a memory access by the slave processor is different from the page address that is to be accessed by the slave processor, then the slave processor automatically causes the page mode memory to reload that last page back into the page buffer upon completion of the memory access by the slave processor.

Figure 7:

FIG. 7 is a diagram corresponding to FIG. 10 described above, for illustrating the operation of the multiprocessor system of FIG. 2 when using the slave processor 2 of FIG. 1. The program sequences that are executed by the master processor and slave processor in FIG. 7 are identical to those of FIG. 10. In this case, when the slave processor begins a long access, by sending to the page mode memory the new address q (i.e. at the start of the fourth execution step), the page address p (i.e. the address of the last page to be accessed by the master processor) is being held in the page address memory section 7 of the slave processor. When the slave processor completes its memory access operation (i.e. by the end of the fifth execution step), the page address p is sent from the page address memory section 7 to the page mode memory, to cause the page p to be reloaded into the page buffer (that operation being indicated as "access p"). As a result, when the master processor thereafter begins its seventh execution step, then since the page p is already loaded into the page buffer, the required intra-page address b can be immediately accessed, i.e. a short access can be executed by the master processor.

It can thus be understood that by comparison with the prior art example of FIG. 10, all of the 7 instructions of the program sequence shown for the master processor have been completed within 8 execution steps, whereas with the prior art example of FIG. 10, a total of 9 execution steps would be required. In this way, a significant increase in the program execution speed of the master processor can be achieved by comparison with the prior art, and since the frequency of memory accessing by the master processor is considerably greater than that of a slave processor, the overall system performance can thereby be significantly improved.

With the processor embodiment of FIG. 1, when a slave processor completes a memory access, it automatically executes reloading into the memory pace buffer of the page that was present there immediately prior to the start of the access by the slave processor (i.e. if that page was different from the page that was accessed by the slave processor), which had been accessed by the master processor. However if in fact the master processor, following completion of that access by a slave processor, is to in fact access a different page from that which it had accessed immediately prior to the slave processor access, then such automatic page reloading will not produce the desired increase in processing speed, but will have the opposite effect. That is to say, referring to the example of FIG. 7, if the sixth instruction of the program sequence for the master processor designates that a page other than page p is to be accessed, then of course it will be necessary for the master processor to execute a long access as its seventh and eighth execution steps (e.g., instead of "access b", it might for example execute "access r", then "access b", to access the address b within page r, rather than within page p). In such a case, the sixth execution step by the slave processor ("access p") is ineffective, and represents wasted time. Another embodiment of the invention will be described in which such unnecessary page reloading following a memory access by a slave processor is eliminated.

FIG. 5 is a block diagram of this embodiment of a multiprocessor system according to the present invention, while FIG. 3 is a block diagram of an embodiment of a processor, designated by numeral 60, that is suitable for use as a slave processor in the system of FIG. 5, and FIG. 4 is a block diagram of a processor, designated by numeral 70, that is suitable for use as a master processor in that system. In FIG. 3, components which are identical to components of the embodiment of FIG. 1 are indicated by corresponding reference numerals. The embodiment of FIG. 3 differs from that of FIG. 1 by further including a page save signal receiving section 14, which is coupled to receive a control signal, referred to in the following as a page save signal, which is generated from the master processor of the system and supplied to all of the slave processors via a common signal line 8. The purpose of that page save signal is to indicate to each slave processor that the next page of the page mode memory to be accessed by the master processor will be (or has a high probability of being) identical to that which was last accessed by the master processor. In response, the page save signal receiving section 14 generates a control signal that is supplied to the interface section of the slave processor, designated by numeral 11. That control signal controls the operation of the interface section 11 such as to enable or inhibit page reloading to be executed following a memory access by the slave processor (if, as described above, the page address held in the page address memory section 7 is different from the page address that is accessed by the slave processors).

As shown in FIG. 5, the control signal line 8 is connected in common to all of a plurality of slave processors 34a to 34n, and to the master processor 33, in this case.

FIG. 4 is a block diagram of a first embodiment of a processor, designated by numeral 80, for use as a master processor in the multiprocessor system of FIG. 5. This is made up of a processing section 15, an address generating section 16, an interface section 17, a page save signal output section 18, a page address memory section 19 and a page address comparator 20. As for the slave processor embodiments of FIGS. 1 and 3, the page address memory section 19 always holds the address of the last page to have been accessed by any of the processors of the multiprocessor system, and when the address generating section 16 generates a new page address, that is compared with the page address held in the page address memory section 19, by the page address comparator 20. A corresponding output signal is then supplied from the page address comparator 20 to the interface section 17 whereby if the page addresses are mutually identical, then a short access is initiated, while if they are mutually different a long access is initiated. However in this case, the automatic page reloading function that was described for the slave processor of FIG. 1 is not executed upon completion of a memory access by the master processor. The output signal from the page address comparator 20 is used only for determining whether a long access or a short access is to be executed, when a memory access by the master processor begins.

When the processing section 15 detects that the next page to be accessed by the master processor will be identical to the last page that was accessed by the master processor, the processing section 15 supplies a control signal to the page save signal output section 18 whereby the page save signal output section 18 sets the page save signal to the condition (as described above) which indicates to all of the slave processors that automatic page reloading is to be executed.

The operation of the multiprocessor system of FIG. 5, using the slave processor embodiment of FIG. 3 and the master processor embodiment of FIG. 4, will be described referring to the examples of FIGS. 7 and 8. First, in the example of FIG. 7, in which the master processor accesses a page (p) following a memory access (to page q) by a slave processor, with page p being the same page that was accessed by the master processor processor to that slave processor access, the operation will be identical to that described hereinabove for the case in which the slave processor embodiment of FIG. 1 is used. That is to say, when the slave processor begins its fourth execution step ("access q"), the page save signal output section 18 of the master processor is outputting the page save signal, which indicates that the page p will again be accessed by the master processor after completion of memory access by the slave processor. In response to that condition of the page save signal, received by the page save signal receiving section 14 of the slave processor via the signal line 8, the output signal from the page save signal receiving section 14 of the slave processor causes the interface section 11 to transfer the page address (p) held in the page address memory section 7 to the page mode memory upon completion of memory access by the slave processor (i.e. after access to the address e has been completed). Thus in the sixth execution step, the page p is reloaded into the page buffer of the memory, so that the master processor can thereafter execute a short access as its seventh execution step (to access the address b within the page p).

Figure 8:
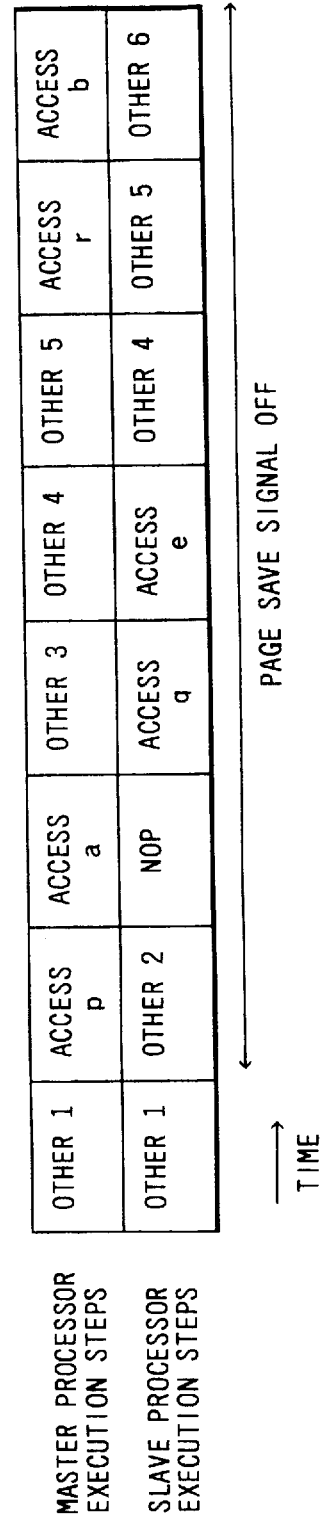

In the example of FIG. 8, the sixth instruction of the program sequence of the master processor is "access r/b", i.e. signifying "access the address b within page r". Thus in this case the master processor will access a page, following a memory access by a slave processor, that is different from the page that was accessed by the master processor prior to that memory access by the slave processor. It is therefore not appropriate for the page p to be reloaded into the page buffer of the memory upon completion of memory access by the slave processor. Hence, at the end of the third execution step by the master processor (i.e. on completion of accessing address a of page p), the page save signal output section 18 of the master processor outputs the page save signal, indicating to all of the slave processors that page reloading is not to be executed following a memory access by a slave processor. Thus, after a slave processor has completed accessing the address e, it does not send to the page mode memory the page address (p) that is held in its page address memory section 7, so that automatic page reloading of page p does not occur.

Thereafter, as its seventh execution step, the master processor initiates loading of the page having address r into the page buffer of the memory, to being a long access.

In this way, unnecessary page reloading, which would occur in this case with the multiprocessor system of FIG. 2 using the slave processor embodiment of FIG. 1, is avoided.

Figure 6:
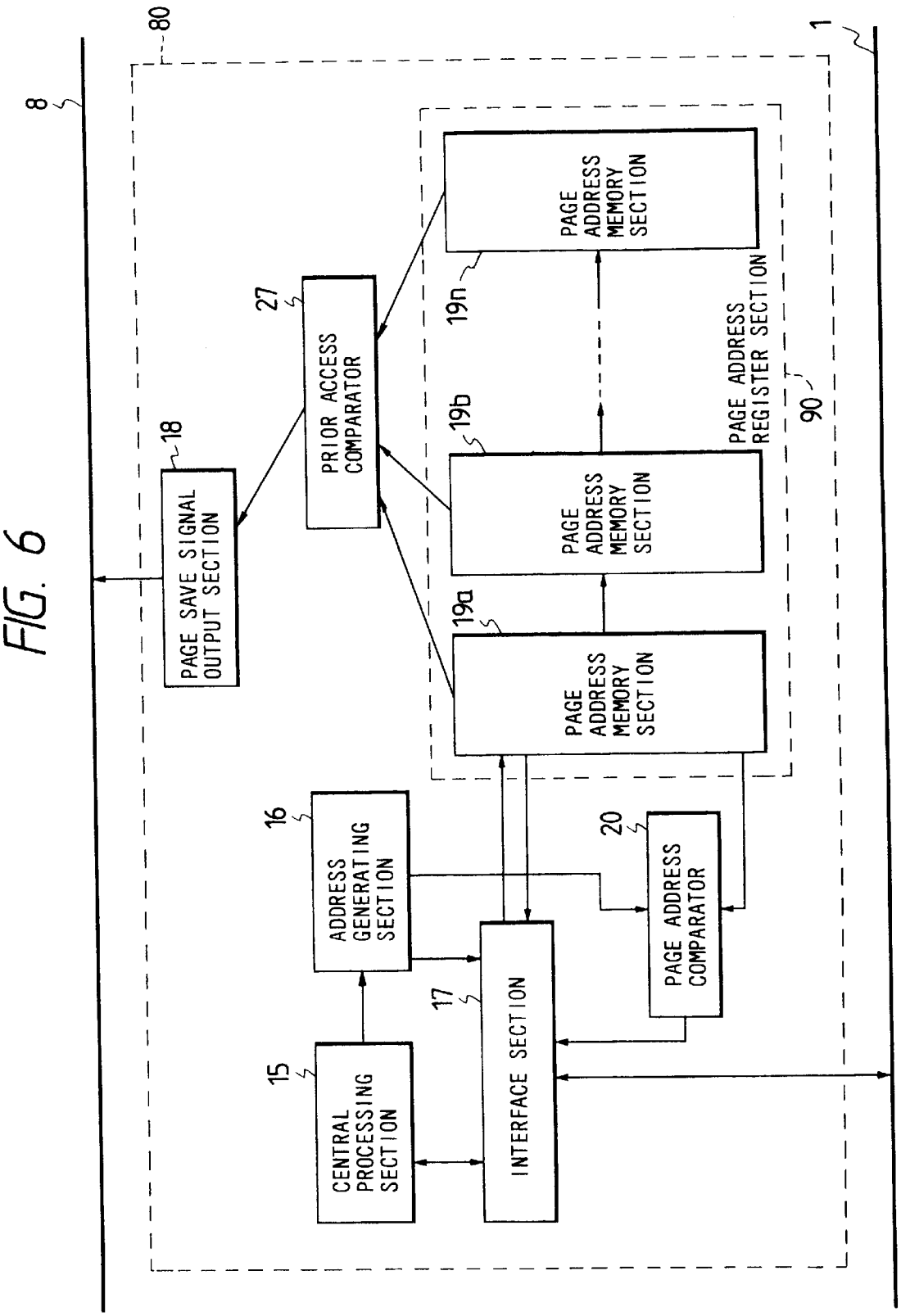
FIG. 6 is a block diagram of another embodiment of a processor for use as a master processor in conjunction with the slave processor of FIG. 3.

FIG. 6 is a block diagram of another embodiment of a master processor, designated by numeral 80, for use in the multiprocessor system of FIG. 5. As for the preceding master processor embodiment, this generates a page save signal from a page save signal output section 18, that is sent via a common signal line 8 to all of the slave processors to indicate whether or not automatic page reloading is to be executed immediately following a memory access by any slave processor. However rather than being generated under the control of a command signal from the processing section 15 as in the embodiment of FIG. 4, the page save signal output section 18 generates the page save signal in response to an output signal from a prior access comparator 27, which compares respective values of page address that are outputted from a page address register section 90. The page address register section 90 is formed of a plurality of page address memory sections, designated as 19a, 19b, ... 19n, which are successively connected in a shift register configuration. Each time any of the processors of the multiprocessor system accesses a new page, then the address of that page is loaded into the page address memory section 19a from the interface section 17 prior to completion of that memory access. At the same time, the page address that was previously held in the page address memory section 19a is shifted into the page address memory section 19b, and so on. Thus, the page address memory section 19a always holds the address of the page that was most recently accessed, the page address memory section 19b holds the page address that was accessed before that, and so on. If the same page has been accessed a plurality of times in succession by the master processor, then there is a high probability that the master processor will again access the same page, at its next memory access. Thus, if all of the page addresses contained in the page address register section 90 are mutually identical, the prior access comparator 27 outputs a signal indicative of this to the page save signal output section 18, which thereby outputs the page save signal to the common signal line 8 to indicate that automatic page reloading is to be executed by any of the slave processors that is currently accessing the memory.

The contents of the first page address memory section 19a are also inputted to the page address comparator 20, to be utilized in the same way as those of the page address memory section 19 of the embodiment of FIG. 4, i.e. for judging whether a new memory access by the master processor is to be a long or a short access as described hereinabove.

Figure 9:

In practice, it is only necessary to detect that the same page has been accessed by the master processor a small number of times in succession, in order to judge that there is a high probability of that page being accessed next by the master processor. It will therefore be assumed in the following description that the page address register section 90 contains only two page address memory sections, i.e. 19a and 19b. In this way, the first time that a page is accessed by the master processor, automatic reloading by a slave processor will not be executed following that master processor access. However if that page is then accessed a second time by the master processor, then thereafter, automatic page reloading of that page into the page buffer of the memory will be executed following a memory access by a slave processor. The operation of a multiprocessor system utilizing the master processor embodiment of FIG. 6, with two page address memory sections in the page address register section 90, will be described referring first to the program execution example of FIG. 9. In this example, the master processor executes a program consisting of a sequence of 10 instructions, in which the second instruction designates that address a within page p is to be accessed, the sixth instruction designates that address b within page p is to be accessed, and the tenth instruction designates that address c within page p is to be accessed. A slave processor executes a program also consisting of a sequence of 10 instructions, in which the third instruction designates that address e within page q is to be accessed, and the seventh instruction designates that address f within page q is to be accessed. In this case, at the start of the fourth execution step, in which the slave processor begins a long access for accessing address q, the page address p will only be held in one of the page address memory sections of the page address register section 90 of the master processor. Thus, the page save signal is not outputted from the page save signal output section 18 of the master processor, and hence when the slave processor completes its access to address e (the fifth execution step), the page address q will be left in the page buffer of the memory. Thus, in the seventh execution step, the master processor must begin a long access, by reloading the page p into the page buffer. The slave processor thereafter again accesses the page q, and when that access has been completed, since now the page address p is held in both of the page address memory sections of the page address register section 90 of the master processor, the page save signal is being the master processor. Hence, the slave processor (as its eleventh execution step) loads the page p into the page buffer of the memory, i.e. by sending the page address p from its page memory section to the page mode memory. Thus, the master processor can thereafter access the address c within page p by a short access, as its tenth execution step.

Thereafter, so long as the master processor continues to access addresses within the page p, each intervening memory access by any of the slave processors will be followed by automatic reloading of page p into the page buffer, so that only short accesses by the master processor will be required.

What is claimed is:

1. A multiprocessor system having a master processor (30), a plurality of slave processors (32a, . . . 32n), a page mode memory (31) incorporating a page buffer, and bus means (1) for interconnecting said page mode memory, said master processor and said plurality of slave processors, wherein each of said slave processors comprises:

processing means (3) for generating memory access command signals when a memory access is to be executed by said each slave processor;

address generating means (4) responsive to said memory access command signals for generating a new page address which specifies a data page stored in said page mode memory;

page address memory means (7) for holding a most recent page address, said most recent page address being a page address most recently accessed by any of said master processor and said plurality of slave processors prior to generation of said new page address;

page address comparator means (6) for comparing said new page address with said most recent page address, and for generating a comparison signal having a first and a second condition respectively corresponding to said new page address and most recent page address being mutually different or mutually identical; and interface means (5) for transferring data, command signals and addresses between said each slave processor and said bus means, and responsive to said memory access command signals, said new page address and said first condition of the comparison signal, in combination, for generating and supplying to said bus means respective command signals to implement, successively, loading of a page corresponding to said new page address into said page buffer, accessing of a specified portion of said page in said page buffer by said processing means (3), and loading of a page corresponding to said most recent page address into said page buffer, said interface means functioning continuously, when said each slave processor is not accessing said page address memory, to monitor said bus means to detect each new access of said page mode memory and to update said page address memory means by writing therein a page address specified in said each new access.

2. A multiprocessor system having a plurality of processors including a master processor and a plurality of slave processors, a page mode memory incorporating a page buffer, and bus means for interconnecting said page mode memory, said master processor and said plurality of slave processors, wherein each of said plurality of processors comprises:

processing means for generating memory access command signals when a memory access is to be executed by said each processor;

address generating means responsive to said memory access command signals for generating a new page address which specifies a data page stored in said page mode memory;

page address memory means for holding a most recent page address, said most recent page address being a page address most recently accessed by any of said processors prior to generation of said new page address; and page address comparator means for comparing said new page address with said most recent page address, and for generating a comparison signal having a first and a second condition respectively corresponding to said new page address and most recent page address being mutually different or mutually identical;

wherein each of said slave processors includes interface means for transferring data, command signals and addresses between said each slave processor and said bus means, and responsive to said memory access command signals, said new page address and said first condition of the comparison signal, in combination, for generating and supplying to said bus means respective command signals to implement, successively, loading of a new page corresponding to said new page address into said page buffer, accessing of a specified portion of said new page in said page buffer by said processing means, and loading of a page corresponding to said most recent page address into said page buffer, said interface means functioning continuously, when said each slave processor is not accessing said page address memory, to monitor said bus means to detect each new access of said page mode memory and to update said page address memory means by writing therein a page address specified in said each new access, and wherein said master processor includes interface means for transferring data, command signals and addresses between said master processor and said bus means, and responsive to said memory access command signals, said new page address and said first condition of the comparison signal, in combination, for generating and supplying to said bus means command signals to implement, sequentially, loading of a new page corresponding to said new page address into said page buffer, and accessing of a specified portion of said new page in said page buffer by said processing means.

3. The multiprocessor system according to claim 2, wherein said processing means (15) of said master processor further includes means for detecting a condition in which a next page to be accessed by said master processor is identical to a last page that was accessed by said master processor and for generating a control signal in response to said condition, wherein said master processor further includes page save signal generating means (18, 8) responsive to said control signal for supplying a page save signal to all of said plurality of slave processors, and wherein each of said slave processors further includes means (14) responsive to said page save signal for inhibiting said loading of a page corresponding to an address held in said page address memory means (7) into said page buffer.

4. The multiprocessor system according to claim 2, wherein said page address memory means of said master processor comprises page address register means (90) for holding a plurality of page addresses successively accessed by said master processor, said plurality of page addresses comprising at least said most recently accessed page address and a page address which was accessed by said master processor prior to said most recently accessed page address, and wherein said master processor further comprises:

prior access comparator means (27) for comparing said page addresses held in said page address register means, and for generating a predetermined control signal if all of said page addresses are found to be mutually identical, and page save signal generating means (18, 8) responsive to said predetermined control signal for supplying a page save signal to all of said plurality of slave processors;

and wherein each of said slave processors further includes means (14) responsive to said page save signal for inhibiting said loading of a page corresponding to a page address held in said page address memory means (7) into said page buffer.

\* \* \* \* \*